United States Patent [19]

Chou et al.

[11] 4,388,282

[45] Jun. 14, 1983

[54] METHOD FOR REGENERATION OF SODIUM SULFITE FROM SPENT FLUE GAS DESULFURIZATION PROCESSES

[75] Inventors: Eng J. Chou, Piscataway; Bruce Weinstein, North Bergen, both of N.J.

[73] Assignee: Research-Cottrell, Inc., Somerville, N.J.

[21] Appl. No.: 333,410

[22] Filed: Dec. 22, 1981

[51] Int. Cl.$^3$ ............................................. C01B 17/00
[52] U.S. Cl. ................................. 423/242; 423/166; 423/512 A
[58] Field of Search .......... 423/242 A, 244 A, 244 R, 423/512 A, 166, 242 R, 431

[56] References Cited

U.S. PATENT DOCUMENTS

| | | | |
|---|---|---|---|
| 3,989,797 | 11/1976 | Brady et al. | 423/242 |
| 3,995,006 | 11/1976 | Downs et al. | 423/242 |
| 4,267,156 | 5/1981 | Dauerman et al. | 423/242 |

*Primary Examiner*—O. R. Vertiz
*Assistant Examiner*—Gregory A. Heller
*Attorney, Agent, or Firm*—Kerkam, Stowell, Kondracki & Clarke

[57] ABSTRACT

A double alkali process employs limestone to regenerate spent sodium sulfite and then recirculates the unreacted limestone to attain a high internal stoichiometry and high limestone utilization. The regeneration of the sodium sulfite is carried out in a plurality of reactors and separation of the slurry from the reactors is carried out in at least one hydroclone. The at least one hydroclone has two primary functions: one to promote the reaction of $Na_2SO_3$, which reduces the reactor volumes and reduces the temperature of conversion; and two to reduce the concentration of the limestone overflow, thus increasing the limestone utilization.

5 Claims, 2 Drawing Figures

LIMESTONE REGENERATION SYSTEM
USING ONE HYDROCLONE

LIMESTONE REGENERATION SYSTEM USING THREE HYDROCLONES

METHOD FOR REGENERATION OF SODIUM SULFITE FROM SPENT FLUE GAS DESULFURIZATION PROCESSES

TECHNICAL FIELD

The present invention is directed to a double alkali process employing limestone to regenerate spent sodium sulfite and to recirculate the unreacted limestone to thereby attain a high internal stoichiometry and high limestone utilization.

BACKGROUND OF THE PRIOR ART

An aqueous solution of sodium sulfite is often used in a countercurrent absorption tower to absorb sulfur dioxide from flue gas according to the following reaction:

(1) $Na_2SO_3 + H_2O + SO_2 \rightarrow 2NaHSO_3$

If oxygen is also present in the gas stream (such as flue gases) some sulfite is oxidized to sulfate.

(2) $2Na_2SO_3 + O_2 \rightarrow 2Na_2SO_4$

The spent absorbent contains an aqueous solution of $NaHSO_3$, $Na_2SO_4$ and $Na_2SO_3$.

To regenerate the sodium sulfite the spent absorbent is reacted with calcium carbonate.

The primary reactions, shown below, take place in the regenerators external from the absorber loop so that solids do not enter the absorber.

(3) $2NaHSO_3 + CaCO_3 \rightarrow CO_2 + Na_2SO_3 + CaSO_3 \cdot \frac{1}{2}H_2O + \frac{1}{2}H_2O$ (4) $4NaHSO_3 + Na_2SO_4 + 2CaCO_3 \rightarrow 3Na_2SO_3 + CaSO_3 \cdot \frac{1}{2}H_2O \cdot CaSO_4 \cdot \frac{1}{2}H_2O + CO_2 + H_2O$ Existing technology on regeneration of sodium sulfite in the U.S. employe, in the regenerators, lime. However, limestone is far less expensive than lime and reduces the regeneration cost. Japanese processes use limestone to regenerate sodium sulfite but the conditions do not maximize the amount of sodium sulfate coprecipitated by Reaction (4). To remove the sodium sulfate the Japanese FGD (flue gas desulfurization) plants use a costly sulfate removal process that requires sulfuric acid.

BRIEF SUMMARY OF THE INVENTION

The present invention provides high limestone utilization, high sulfite conversion, precipitation of sulfate as calcium sulfate at a rate equal to sulfate formation by oxidation, and removal of some of the magnesium in the limestone by coprecipitation with calcium as mixed crystals of sulfites and sulfates.

These and other advantages are brought about by carrying out the regeneration of the sodium sulfite in a plurality of reactors and separation of the slurry from the reactors in at least one hydroclone. The at least one hydroclone has two primary functions: one to promote the reaction of $NaHSO_3$, which reduces the reactor volumes and reduces the temperature of conversion; and two, to reduce the concentration of the limestone overflow, thus increasing the limestone utilization.

BRIEF DESCRIPTION OF THE DRAWINGS

The invention will be more particularly described in reference to the drawings wherein.

DETAILED DESCRIPTION OF THE INVENTION

As hereinbefore set forth the present invention is for a process to economically (i.e. high reagent utilization) regenerate sodium sulfite using limestone as the reagent in relatively short resident time (2–3 hr) reactors (typically agitated, baffled vessels) where the temperature is similar to the spent absorbent (50°–55° C.) thereby eliminating the need for external heat.

Figure 1:
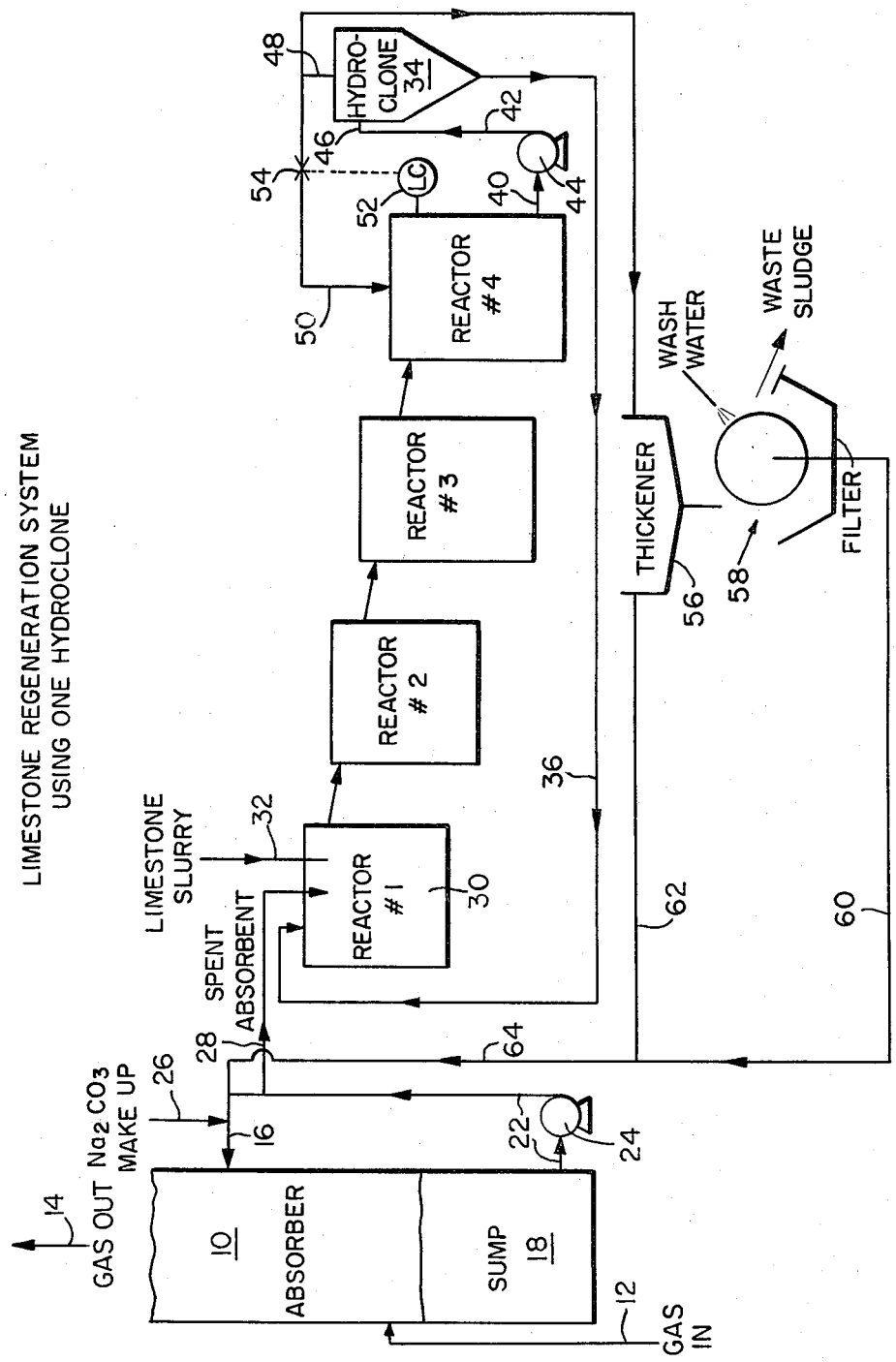
FIG. 1 is a process diagram of one form of the invention employing four reactors and one hydroclone.

Referring to FIG. 1 of the drawing, 10 designates a flue gas/$SO_2$ absorber, wherein flue gas containing $SO_2$ enters the bottom of the absorber as indicated by arrow 12 and flue gas stripped of its $SO_2$ content exists at the top of the absorber as indicated by directional arrow 14. A sodium carbonate scrubbing slurry enters the absorber as indicated by arrow 16 and the partially spent scrubbing slurry is removed from the sump 18 via line 22 and pump 24. A portion of the slurry removed from the sump 18 is redirected into the absorber along with makeup sodium carbonate via conduit 26. Another portion of the spent and partially spent absorbent is directed via conduit 28 into a first reactor vessel 30 which preferably is provided with an agitator, not shown, and suitable baffles to decrease the reaction time. Also directed into the reactor 1 is ground limestone via conduit 32 and unreacted limestone from the bottom of the hydroclone 34 via conduit 36 as to be more fully described hereinafter.

Overflow from the reactor #1, designated 30, flows by gravity into reactor 2 thence into reactors 3 and 4. From the reactor 4, the reacted slurry is pumped via conduits 40 and 42 and pump 44 to the inlet 46 of the hydroclone 34.

The underflow from the hydroclone, comprising a slurry consisting of mainly of unreacted limestone (particles sizes of 12–44 micron, is returned to the first reactor as hereinbefore set forth. The hydroclone overflow solids exiting the hydroclone via conduit 48 consists mainly of $CaSO_3 \cdot \frac{1}{2}H_2O$ (particle size of 3–12 microns).

Some of the overflow is sent via conduit 50 to the last reactor, reactor 4. The amount of the overflow returned to reactor 4 is determined by a liquid level controller 52 connected to valve 54 in line 50. The remainder of the hydroclone overflow is directed to a thickener 56. The sludge from the thickner 56 is directed to a filter generally designated 58 and the overflow from the thickener 56 and the liquid withdrawn by the filter 58 are directed and utilized as part of the make up liquid for the absorber 10 via conduits 60, 62 and 64. The cake from the filter 58 comprises waste sludge.

Typically the sodium sulfite regeneration is carried out in a relatively short residence time of about 2 to 3 hours in the four reactors, illustrated in FIG. 1 where the temperature is about the temperature of the spent absorbent, that is, about 50°–55° C., where the composition of the spent absorbent is typically 3% wt $NaHSO_3$, 2.2% wt $Na_2SO_3$, 12.5% wt $Na_2SO_4$.

Typically at the filter 58 the solids are concentrated at about 50% solids and the cake can be washed as illustrated to recover sodium salts. The wash water may be combined with the filtrate and returned to the absorber and the small amount of sodium lost in the discharged waste sludge is replaced with makeup sodium carbonate.

Table 1 contains data on test runs listing operating conditions, where high reagent utilization, efficient bisulfite conversion and high amounts of sulfate coprecipitate are achieved simultaneously.

Figure 2:
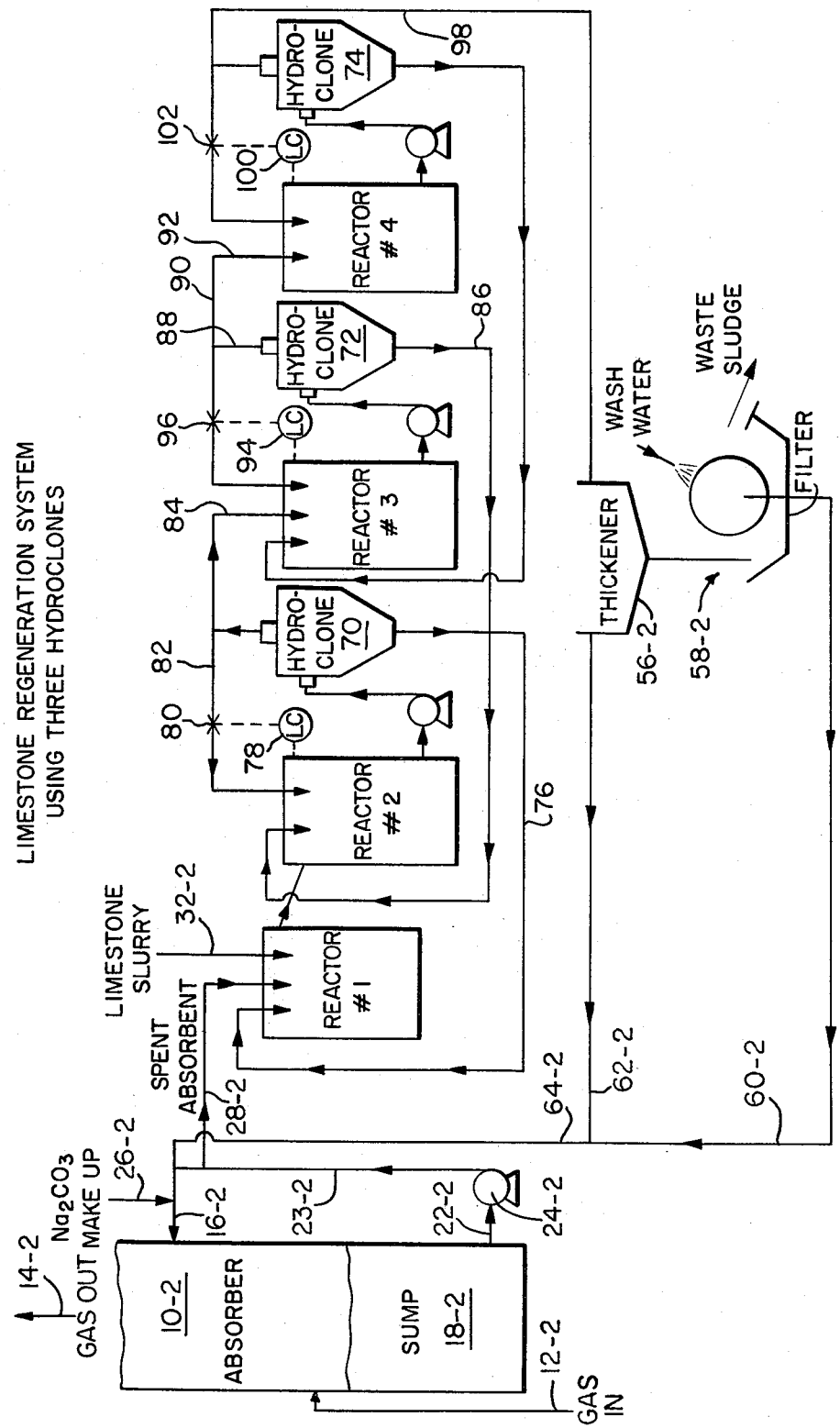
FIG. 2 is a modified process diagram employing four reactors and three hydroclones.

Variations of the processes described in reference to FIG. 1 can incorporate differing numbers of hydroclones and reactors and a 4 reactor 3 hydroclone system is illustrated in FIG. 2. In FIG. 2, like equipment is provided with reference characters ending in -2 which correspond to that described in reference to FIG. 1. In same extent of conversion of $NaHSO_3$ to $Na_2SO_3$ compared to a system without the hydroclones.

(2) Hydroclone's overflow which has a much lower concentration of $CaCO_3$ than the last reactor is the only stream sent to the dewatering system for ultimate disposal of the solids. This gives much higher limestone utilization than if no hydroclones were used.

The high ratio of $Na_2SO_4/Na_2SO_3$ in the spend absorbent increases the extent of Reaction 5 so that a sufficient (about 7–9%) fraction of the $Na_2SO_4$ is converted to $CaSO_4\frac{1}{2}H_2O$. For most FGD systems this rate of sulfate removal (as $CaSO_4\frac{1}{2}H_2O$) equals its formation by oxidation (Reaction 2). Therefore, no costly auxiliary step is needed for sulfate removal.

TABLE I

| | OPERATING CONDITIONS AND LIMESTONE UTILIZATION | | | | | | | |
|---|---|---|---|---|---|---|---|---|
| RUN NO. | TEMP. IN REACTOR °C. | MG++ (PPM) | HSO₃ CONCENTRATION | | HSO₃ REACTED % | LIME STONE SR | LIMESTONE UTILIZA-TION, % | f |
| | | | ABSORBER | REACTOR 4 | | | | |
| T-1 | 65 | 666 | 0.583 | 0.089 | 84.8 | 0.99 | 84.3 | — |
| T-2 | 70 | 450 | 0.491 | 0.068 | 86.1 | 1.18 | 81.1 | 8.4 |
| T-3 | 54 | 673 | 0.537 | 0.131 | 75.6 | 1.14 | 85.2 | 9.9 |
| T-4 | 55 | 660 | 0.542 | 0.130 | 76.0 | 1.19 | 82.7 | 7.9 |
| T-5 | 54 | 655 | 0.578 | 0.146 | 74.8 | 1.02 | 90.6 | 7.6 |

Remarks:
1. Data for Run T-1 based on 1st eight hour period.
2. Bisulfite concentration in absorber for Runs T-3, T-4 and T-5 were corrected for dilution because of fresh water used to slurry limestone. Runs T-1 and T-2 used centrate to slurry limestone so no correction factors was used.
3. Mg++ are based on average concentration for all reactors as reported in Table B-1.
4. Only Run T-5 used hydroclone to recover unreacted limestone.
5. Limestone SR is the moles limestone/moles $SO_2$ fed.
6. f = mole % of reacted limestone that formed coprecipitated calcium sulfate.
7. The average concentration of $Na_2SO_4$ was 1.0 molar.

FIG. 2, the 3 hydroclones designated 70, 72 and 74 are positioned between reactors 2 and 3; 3 and 4; and following reactor 4.

It will be noted that hydroclone 70 has its underflow directed to reactor 1 via conduit 76 and its overflow directed to reactor 2 as controlled by the liquid controller 78 and valve 80 or via conduits 82 and 84 to reactor 3.

The underflow from hydroclone 72 is directed to reactor 2 via conduit 86 and the overflow 88 is directed to reactor 4 via conduits 90 and 92 and/or to reactor 3 as controlled by liquid controller 94 and its connected valve 96.

Hydroclone 74 is like hydroclone 34 of the form of the invention illustrated in FIG. 1 in that of the overflow from the hydroclone is directed at least in part, via conduit 98 to the thickner 56-2 thence to the filter 58-2, with the filtrate and washwater being directed via conduits 60-2, 62-2 and 64-2 to the absorber 10-2. Another portion of the overflow from the hydroclone 74 is directed to reactor 4 as controlled by liquid controller 100 and valve 102.

In this form of the invention, as in the form described in reference to FIG. 1, the hydroclones serve two important functions:

(1) They increase the internal limestone stoichiometry (defined as moles $CaCO_3$/moles $NaHSO_4$ in the reactors) thereby promoting Reaction (4), the regeneration of $Na_2SO_3$. This permits reduced reactor volume and reduced temperature to achieve the

We claim:

1. A process for regeneration of a spent sodium sulfite slurry from a flue gas desulfurization absorber employing in the absorption tower $Na_2SO_3$ comprising carrying out the regeneration in a plurality of serially arranged reactors, adding crushed limestone to the first in the series of reactors, separating the slurry from the reactors in at lest one hydroclone, directing the overflow from the at least one hydroclone to a thickener, directing the underflow from the at least one hydroclone to at least one of the plurality of reactors and utilizing the liquid from the thickener to provide at least a portion of the slurry for the absorber.

2. The process as defined in claim 1 wherein there is one hydroclone which receives the slurry from the last in the series of reactors and the underflow from the hydroclone is directed to the first in the series of the reactors.

3. The process as defined in claim 2 wherein there are four reactors and the underflow from the hydroclone comprises primarily water and unreacted limestone.

4. The process defined in claim 1 wherein there are at least four reactors and three hydroclones and the hydroclones are positioned to receive reactor output from reactors two, three and four of the series.

5. The process defined in claim 4 wherein the overflow from the last in the series of hydroclones is directed to the thickener.

* * * * *